US007048264B2

(12) United States Patent
Anzawa et al.

(10) Patent No.: US 7,048,264 B2
(45) Date of Patent: May 23, 2006

(54) LIQUID-FILLED ENGINE MOUNT

(75) Inventors: Teruaki Anzawa, Wako (JP); Hideki Matsuoka, Wako (JP); Tatsuhide Sakai, Wako (JP); Masafumi Kyuse, Wako (JP); Ken Iinuma, Wako (JP); Yuji Muto, Saitama (JP); Masahide Kobayashi, Saitama (JP); Koji Iwasaki, Saitama (JP)

(73) Assignees: Honda Giken Kogyo Kabushiki Kaisha, Minato-ku (JP); Yamashita Rubber Co., Ltd., Iruma-gun (JP)

( * ) Notice: Subject to any disclaimer, the term of this patent is extended or adjusted under 35 U.S.C. 154(b) by 376 days.

(21) Appl. No.: 10/165,507

(22) Filed: Jun. 7, 2002

(65) Prior Publication Data

US 2003/0024593 A1 Feb. 6, 2003

(30) Foreign Application Priority Data

Aug. 2, 2001 (JP) ............................ 2001-234890

(51) Int. Cl.
*F16F 5/00* (2006.01)

(52) U.S. Cl. ................................................ 267/140.13

(58) Field of Classification Search ........... 267/140.11, 267/140.13; 248/562, 566
See application file for complete search history.

(56) References Cited

U.S. PATENT DOCUMENTS 4,647,023 A * 3/1987 Ray et al. ................... 267/219
4,815,720 A * 3/1989 Vanessi ................. 267/140.13
4,938,463 A * 7/1990 Miyamoto ............. 267/140.13
4,974,818 A * 12/1990 Kato ..................... 267/140.13
6,176,477 B1 * 1/2001 Takeo et al. ........... 267/140.11
6,267,362 B1 * 7/2001 Satori et al. ........... 267/140.13
6,349,927 B1 * 2/2002 Suzuki .................. 267/140.13
6,382,267 B1 * 5/2002 Childers et al. .............. 141/65
6,491,290 B1 * 12/2002 Muramatsu et al. ... 267/140.14

FOREIGN PATENT DOCUMENTS

JP 2001-27279 1/2001

* cited by examiner

*Primary Examiner*—Christopher P. Schwartz
(74) *Attorney, Agent, or Firm*—Hamre, Schumann, Mueller & Larson, P.C.

(57) ABSTRACT

A liquid-filled engine mount is disclosed which includes a rubbery elastic member interposed between an engine and a vehicle body, a diaphragm positioned in opposed relation to the rubbery elastic member. The engine mount defines a liquid chamber therein. The liquid chamber holds an actuating liquid therein. The liquid chamber has a partition wall disposed therein. The partition wall separates the liquid chamber into primary and secondary chambers. The primary chamber is provided on a side of the elastic member while the secondary chamber is provided on a side of the diaphragm. The partition wall has first and second orifices extending therethrough. The first orifice communicates with both the primary chamber and the secondary chamber. The second orifice communicates with the primary chamber. The first and second orifices provide different resistances to the liquid flowing therethrough. The engine mount includes a resilient means for urging the diaphragm against the partition wall to close an opening of the second orifice. The engine mount includes a diaphragm driving means for forcing the diaphragm against a resilient force the resilient means exerts on the diaphragm to thereby open the opening of the second orifice, such that the second orifice communicates with the secondary chamber. The diaphragm has plural projections formed on a surface thereof.

5 Claims, 8 Drawing Sheets

55 53 54 54 50
52 51

54b 55 53 50 51 54a 54d 54c 10
20
21
22
23
30
31
32
33
34
40
41
42
43
50
51
52
60
61
62
70
80
81
82
90
91
92
93
94
95
96
100
101
102
103
104
105
111
112
121
122
123
124
131
132
133
134
135
136
137
138
139
Bd
En
Lq

(70)
100
103
101
54
106
104
54
102
52
53
54
55
54
50

112
111
80
Lq
Lq
82
81
94
93
92
90
91
70
95
96
102
101
104
103
100
105

En
10
20
40
Lq
30
61
112
102
111
60
80
90
70
62
100
50
Bd
134
135
139
131
136
137
124
141
140
DRIVER
CONTROL
ATMOSPHERE
142
146
145
ATMOSPHERE
En
143
144

LIQUID-FILLED ENGINE MOUNT

FIELD OF THE INVENTION

The present invention relates to an improvement in a liquid-filled engine mount.

BACKGROUND OF THE INVENTION

Engines for automobiles produce various vibrations having a wide variety of amplitudes and frequencies depending upon engine speeds. Various types of engine mounts have been developed to absorb or reduce the vibrations of the engines. One example of the engine mounts is disclosed in Japanese Patent Laid-Open Publication No. 2001-27279 entitled "LIQUID-FILLED ENGINE MOUNT".

The disclosed engine mount includes a rubber member positioned closely to an engine, and a diaphragm positioned in opposed relation to the rubber member. The rubber member and the diaphragm jointly define a space. Such a space is separated by a partition member into primary and secondary chambers filled with liquid. The partition member has first and second orifices provided therein. The first orifice is always opened, whereby the primary chamber communicates with the secondary chamber. The second orifice includes a connection port positioned at a lower end thereof. The diaphragm is urged by a return spring to close the connection port. The engine mount includes a valve for opening/closing the second orifice, and a switch valve. When these valves are actuated, the diaphragm is forced to open the second orifice against a resilient force the return spring exerts on the diaphragm.

When started,the engine runs at an idling speed. During the idling of the engine, the switch valve is actuated such that the diaphragm is lowered by a negative pressure produced within an intake manifold of the engine to thereby open the second orifice.

When the engine idles with the second orifice opened, the liquid flows between the primary and secondary chambers by passing through the first and second orifices, and the rubber member elastically deforms to thereby reduce vibration of the engine.

On the other hand, when the engine runs at an engine speed higher than the idling speed, the second orifice is closed. The liquid fails to flow through the second orifice. Thus, the vibration of the engine is reduced by the deformation of the rubber member and the flow of the liquid only through the first orifice.

For the engine mount thus discussed, the diaphragm and the partition member have their flat surfaces held in contact with each other to close the connection port. In closing the connection port, more specifically, the return spring forces the flat surface of the diaphragm into violent impact on the flat surface of the partition member.

At a time when the engine is started with the connection port closed by the diaphragm, little or no negative pressure required to lower the diaphragm is produced within the intake manifold. It is thus impossible that the diaphragm is lowered using the negative pressure so as to open the second orifice.

At the same time, the rubber member intermittently undergoes a relatively large compressing force produced under the influence of cranking and the like. It takes only a short period of time per application of such a compressing force to the rubber member. In response to each application of the compressing force to the rubber member, the liquid within the primary chamber exerts a pressure on the diaphragm in such a manner as to flow out of the second orifice. The compressing force is large, and hence the pressure exerted on the diaphragm by the liquid within the primary fluid chamber and the first orifice is large, too. When the pressure exerted on the diaphragm by the liquid is greater than the resilient force exerted on the diaphragm by the return spring, the diaphragm moves away from the surface of the partition member by a very small distance to thereby open the connection port.

Each time the diaphragm moves away from the surface of the partition member, the application of the compressing force to the rubber member is terminated. This allows the return spring to force the surface of the diaphragm back into violent impact on the surface of the partition member. The impact between the surfaces of the diaphragm and the partition member produces a sound or noise which is potentially transmitted into a passenger compartment of an automobile. Such a noisy sound should be reduced.

SUMMARY OF THE INVENTION

An object of the present invention is to provide a liquid-filled engine mount including a partition wall and a diaphragm. The engine mount has formed therein primary and secondary chambers separated by the separation wall. The diaphragm is arranged to come into contact with the partition wall without producing any noise.

According to one aspect of the present invention, there is provided a liquid-filled engine mount comprising: an engine mounting member to be mounted to an engine; a body mounting member to be mounted to a vehicle body; a rubbery elastic member interposed between the engine mounting member and the body mounting member; a diaphragm mounted to at least one of the engine mounting member and the body mounting member in opposed relation to the rubbery elastic member, the diaphragm defining a liquid chamber in cooperation with the engine mounting member, the body mounting member, and the rubbery elastic member, the liquid chamber containing an actuating liquid therein; a partition wall disposed within the liquid chamber to separate the liquid chamber into a primary chamber and a secondary chamber, the partition wall having first and second orifices formed to extend therethrough, the first orifice communicating with the primary chamber and the secondary chamber, the second orifice communicating with the primary chamber; a resilient means for urging the diaphragm into contact with the partition wall such that the second orifice does not communicate with the secondary chamber; the diaphragm, by moving against the resilient means, allowing the second orifice to come into communication with the secondary chamber; the first orifice and the second orifice providing resistances to the actuating liquid flowing therethrough, the resistance provided by the first orifice being different from the resistance provided by the second orifice; and the diaphragm and the partition wall having surfaces contacting each other, either one or both of the surfaces of the diaphragm and the partition wall having plural projections formed thereon.

The diaphragm impacts on the contact surface of the partition wall at the projections rather than at the entire area thereof. At this time, no noise is produced.

In a preferred form of the present invention, either one or both of the surfaces of the diaphragm and the partition wall have projected seal portions formed thereon. The projected seal portions surround an opening of the second orifice.

With the diaphragm held in contact with the partition wall, the seal portion maintains a sealing engagement with the contact surface of the partition wall to thereby provide a seal between the contact surface of the diaphragm and the contact surface of the partition wall.

BRIEF DESCRIPTION OF THE DRAWINGS

A certain preferred embodiments of the present invention will hereinafter be described in detail, by way of example only, with reference to the accompanying drawings, in which:

FIG. 3A is a vertical cross-sectional view of a diaphragm of the engine mount while

DETAILED DESCRIPTION OF THE PREFERRED EMBODIMENTS

Figure 1:
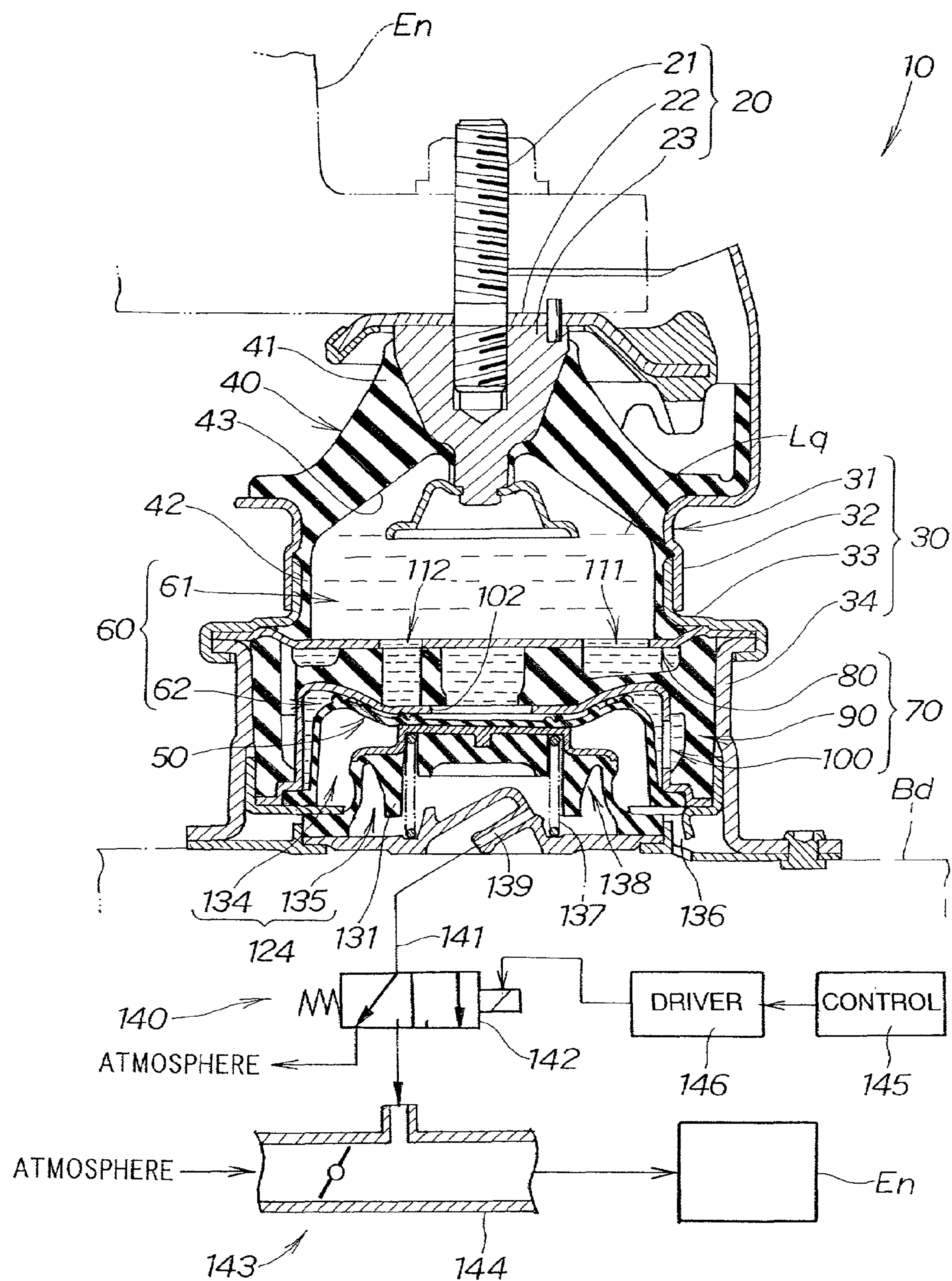
FIG. 1 is a vertical cross-section view of a liquid-filled engine according to the present invention.

Referring to FIG. 1, there is shown a liquid-filled engine mount 10. The engine mount 10 includes an engine mounting member 20 mounted to an engine En, and a body mounting member 30 mounted to a body Bd of a vehicle (notshown). A rubbery elastic member 40 is interposed between the members 20, 30 to connect them together. The elastic member 40 has a liquid-filled chamber 60 defined therein. The engine mount 10 supports the engine En, and reduces vibration of the engine in a manner as will be described later.

As will be discussed later, the elastic member 40 is elastically deformable to absorb or reduce engine vibration transmitted through the engine mounting member 20 to the body mounting member 30. The elastic member 40 has one end 41 smaller in diameter than another end 42 and is tapered to provide a generally bell-shaped configuration. The elastic member 40 is widely opened at the another end 42 to provide a cavity 43.

The engine mounting member 20 includes a bolt 21, a support plate 22, and a first connection portion 23 positioned beneath the support plate 22. The bolt 21 is inserted through the engine En and the support plate 22 into the first connection portion 23. The first connection portion 23 is joined to the one end 41 of the rubbery elastic member 40.

The body mounting member 30 includes a cylindrical second connection portion 31 joined to outside of the another end 42, and a cylindrical support member 34 attached to underside of the second connection portion 31. The second connection portion 31 includes upper and lower halves 32, 33 coupled together. The support member 34 is attached at its underside to the body Bd.

The engine mount 10 includes a diaphragm 50 disposed in opposed relation to the rubbery elastic member 40. The engine mount 10 encloses a liquid chamber 60 having a partition wall disposed therein. The chamber 60 is enclosed with the first connection portion 23, the elastic member 40, the body mounting member 30, and the diaphragm 50. The chamber 60 is separated by the partition wall 70 into a primary chamber 61 and a secondary chamber 62. The primary chamber 61 is provided on a side of the elastic member 40 while the secondary chamber 62 is provided on a side of the diaphragm 50. The partition wall 70 has first and second orifices 111, 11 formed to extend therethrough so as to bring the primary chamber 61 into communication with the secondary chamber 62, as will be described later. The engine mount 10 includes a resilient means 137 for urging the diaphragm 50 into contact with the partition wall 70 to close an opening 102 of the second orifice 112, such that the secondary chamber 62 does not communicate with the second orifice 112. The engine mount 10 further includes a diaphragm driving means 140 for driving the diaphragm 50 against a resilient force of the resilient means 137 to open the opening 102 of the second orifice 112 such that the secondary chamber 62 communicates with the second orifice 112.

Figure 2:
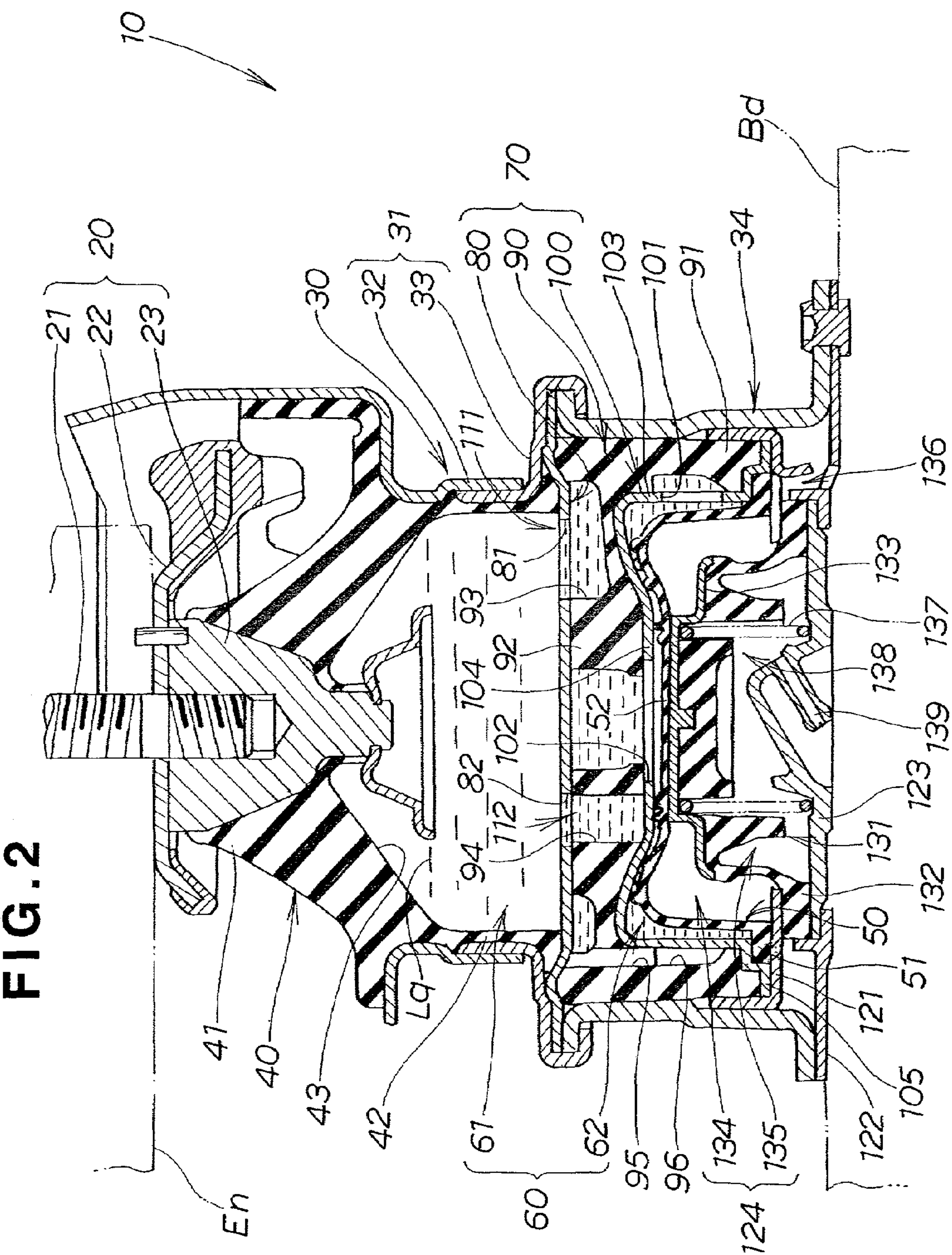
FIG. 2 shows on an enlarged scale the engine mount of FIG. 1.

As shown in FIG. 2, the partition wall 70 includes an upper partition sheet 80, a middle partition member 90, and a lower partition member 100 positioned one over the other.

The upper partition sheet 80 is a flat metal one, and is sandwiched between a lower end of the second connection portion 31 and an upper end of the support member 34. The sheet 80 has first and second apertures 81, 82 formed therein. The apertures 81, 82 vertically go through the sheet 80.

The middle partition member 90 is fitted into the support member 34, and includes a cylinder portion 91 and a top sheet portion 92 formed integrally with a top part of the cylinder portion 91. The top sheet portion 92 is horizontally oriented. The middle partition member 90 is made of rubber. The member 90 may be a flexible plastic. The member 90 has first and second passageways 93, 94 formed therein. The first passageway 93 communicates with the first aperture 81 whilst the second passageway 94 communicates with the second aperture 82. The member 90 has a vertical aperture 95 formed therein. The member 90 further has an inner peripheral groove 96 formed on an inner surface of the cylinder portion 91. The first passageway 93 communicates with the inner peripheral groove 96 via the vertical aperture 95.

The lower partition member 100 is made from metal, and has a generally inverse-cup-shaped configuration. The member 100 is fitted into the cylinder portion 91. The member 100 has first and second openings 101, 102 formed therein. The first opening 101 communicates with the groove 96 while the second opening 102 communicates with the second passageway 94. The member 100 includes a cylinder portion 103 through which the first opening 101 extends. The member 100 further includes a top sheet portion 104 through which the second opening 102 extends. The second opening 102 is hereinafter referred to as "an opening of the second orifice 112".

The first orifice 111 is always opened to thereby communicate with both the primary chamber 61 and the secondary chamber 62. The first aperture 81, the first passageway 93, the vertical aperture 95, the groove 96, and the first opening 101 cooperate with each other to form the first orifice 111.

The second orifice 112 is opened when the engine En runs at an idling speed. The second aperture 82, the second passageway 94, and the second opening 102 cooperate with each other to form the second orifice 112. The second orifice 112 communicates with the primary chamber 61.

The diaphragm 50 is fitted into the cylinder portion 103 and is a generally inverse-cup-shaped thin film. The diaphragm 50 is elastically deformable. The diaphragm 50 is made of, for instance, rubber, or it may be a flexible plastic.

A mounting member 121 extends inwardly from the support member 34. The diaphragm 50 has a flange 51 positioned at a lower end thereof. The flange 51 is held between the mounting member 121 and a flange 105 of the lower partition member 100 to thereby attach the diaphragm 50 to the body mounting member 30.

The primary chamber 61 includes the cavity 43 and is closed by the partition wall 70. The secondary chamber 62 is enclosed with the diaphragm 50 and the partition wall 70. These chambers 61, 62 are formed to communicate with each other by means of the first and second orifices 111, 112. The primary and secondary chambers 61, 62 hold or contain an actuating liquid Lq therein.

The support member 34 has a ring-shaped sheet 122 positioned at an underside thereof. The sheet 122 is mounted to a base sheet 123. Below the diaphragm 50, there is provided a space 50 within which a valve member 131 is disposed. The valve member 131 is a generally inverse-cup-shaped thin film. The valve member 131 is elastically deformable. The valve member 131 is made of, for example, rubber, or it may be a flexible plastic. The valve member 131 has a flange 132 positioned at an underside thereof. The flange 132 is sandwiched between the mounting member 121 and the base sheet 123 to thereby attach the valve member 131 to the body mounting member 30.

The valve member 131 has a metal plate 133 joined to the top thereof. The metal plate 133 is attached to an interior surface of a top sheet portion 52 of the diaphragm 50.

The space 124 is separated by the valve member 131 into two chambers 134, 135. The chamber 134 is enclosed with the diaphragm 50 and the valve member 131. The chamber 134 is communicated via a vent 136 to the atmosphere. The chamber 135 is to be filled with an air having a pressure for opening/closing the valve 131, as will be described later. The chamber 135 is enclosed with the base sheet 123 and the valve member 131.

The resilient means 137 is a compression spring. The resilient means 137 is interposed between the base sheet 123 and an upper inner surface of the valve member 131. The means 137 urges the top of the valve member 131 and the diaphragm 50 in such a direction as to close the second opening 102 of the second orifice 112. The second opening 102 is normally closed by the diaphragm 50.

The diaphragm 50, the lower partition member 100, the base sheet 123, the valve member 131, and the resilient means 137 cooperate with each other to form a valve 138 for opening/closing the second orifice 112.

The base sheet 123 includes a connection pipe 139 which communicates with the chamber 135. The pipe 139 is sloped.

Referring back to FIG. 1, the diaphragm driving means 140 is to drive the valve 138 using a negative pressure produced by a negative pressure source 143, such that the second orifice 112 is opened. The source 143 is connected via a pipe 141 and a magnetically operated switch valve 142 to the connection pipe 139. The source 143 is an intake manifold 144 of the engine En, for example.

The switch valve 142 is actuated using a control unit 145 and a valve driver 146. More specifically, when supplied with a valve control signal output from the control unit 145, the valve driver 146 provides a valve switch signal to the switch valve 142. The switch valve 142 is thus actuated.

Figure 3A:
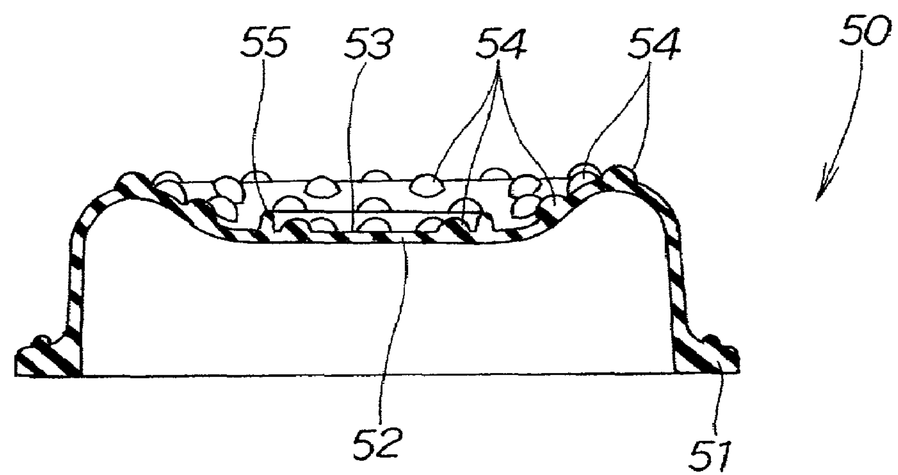
Figure 3B:
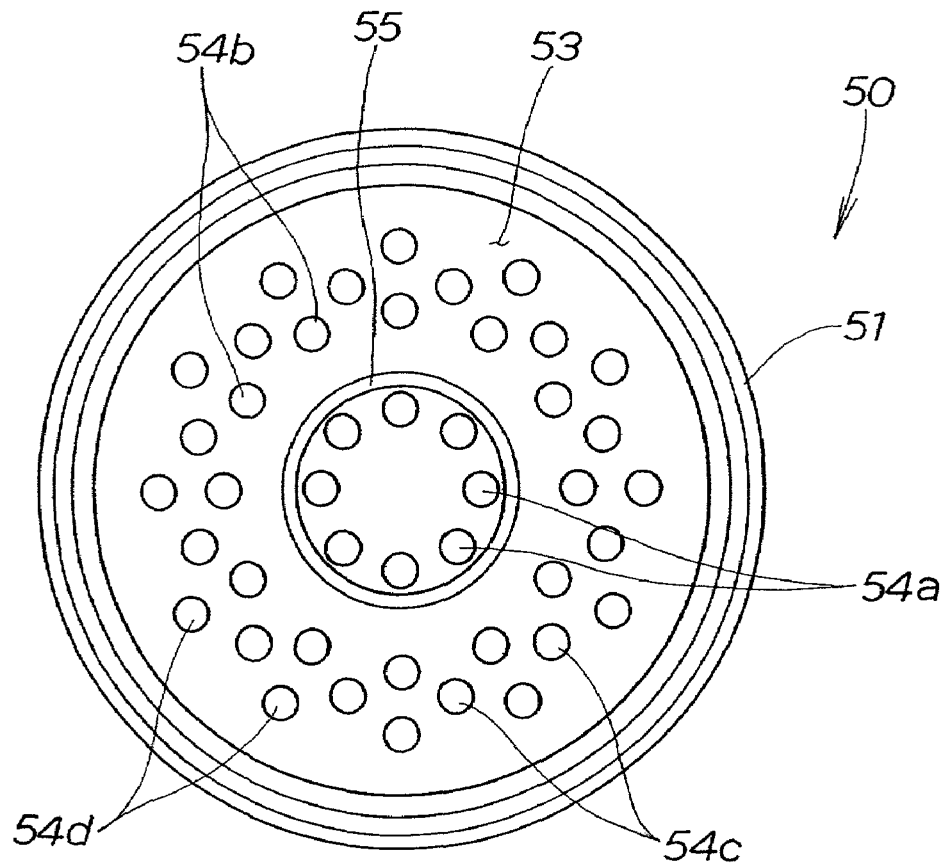
FIG. 3B is a top plan view of the diaphragm.

Turning to FIG. 3A and FIG. 3B, the top sheet portion 52 of the diaphragm 50 has its center positioned lower than a periphery thereof. The center of the top sheet portion 52 is substantially flat. The top sheet portion 52 has an upper surface 53 to contact the partition wall 70 (see FIG. 1 and FIG. 2). The upper surface 53 is hereinafter referred to as "contact surface of the diaphragm 50".

The contact surface 53 has plural hemisphere-shaped projections 54 formed on the substantially entire area thereof. These projections 54 are formed integrally with the contact surface 53. These projections 54 are positioned around the center of the surface 53. More specifically, the projections 54 include first, second, third, and fourth group of projections 54_a_, 54_b_, 54_c_, 54_d_. The first group of projections 54_a_ is closer to the center of the surface 53 than the other groups of projections 54_b_, 54_c_, 54_d_. The first projections 54_a_ of the first group are disposed in the form of a ring. The projections 54_b_ of the second group are disposed outside the projections 54_a_ and take the form of a ring. Similarly, the projections 54_c_ of the third group are disposed outside the projections 54_b_ and are in the form of a ring. Likewise, the projections 54_d_ of the fourth group are positioned outside the projections 54_c_ and take the form of a ring. The contact surface 53 has a projected seal portion 55 formed centrally thereof. The projected seal portion 55 is integral with the contact surface 53. The seal portion 55 provides an annular configuration as viewed in top plan.

Figure 4:
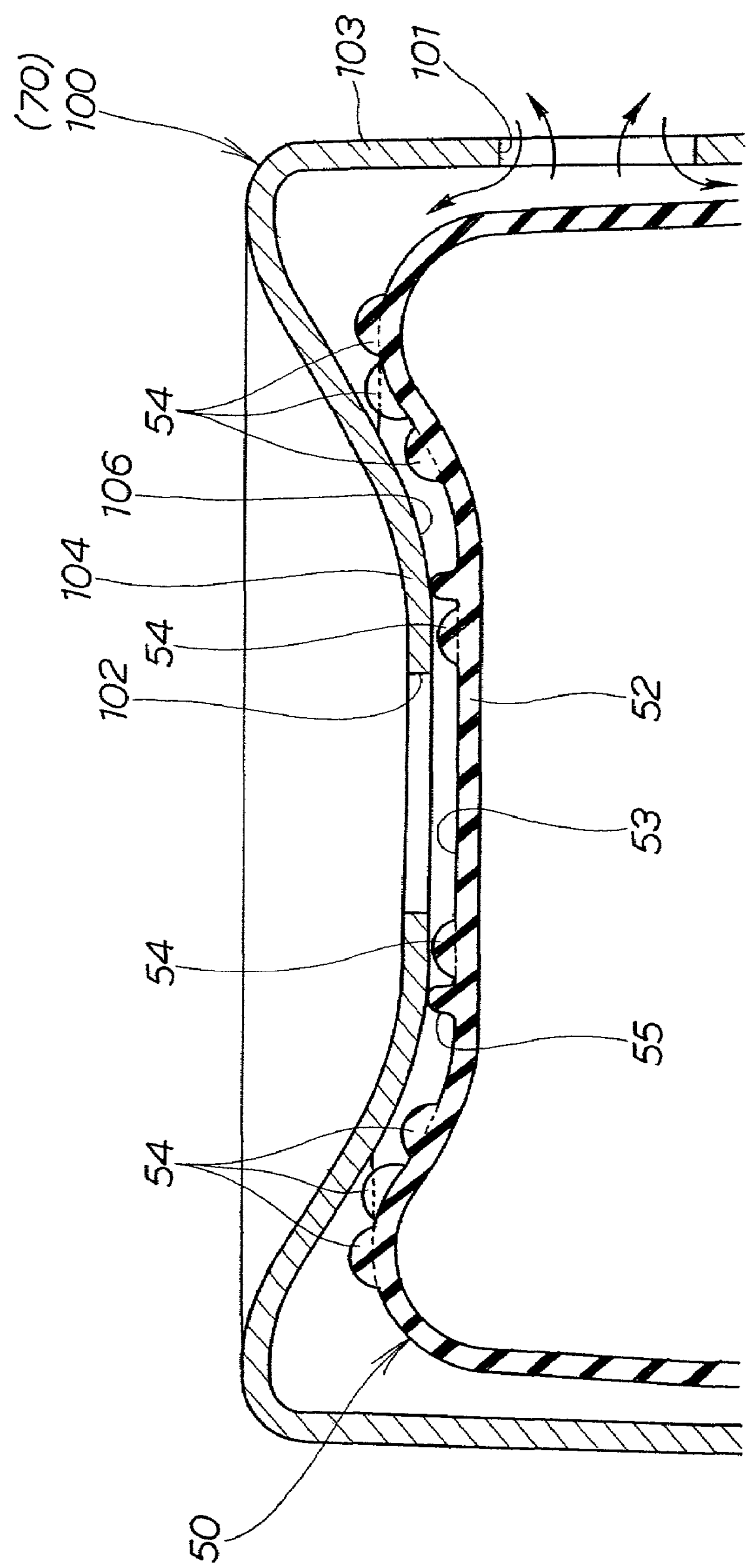
FIG. 4 is an enlarged vertical cross-sectional view of the diaphragm and a lower partition member of a partition wall disposed above the diaphragm of the engine mount.

With respect to FIG. 4, the contact surface 53 of the diaphragm 50 is shallowly or gently recessed in conformity with a bottomside 106 of the topsheet portion 104. The contact surface 53 is substantially flattened at a center thereof. The bottom side 106 is hereinafter referred to as "contact surface 106 of the partition wall 70".

The plural projections 54 provided on the contact surface 53, and the seal portion 55 are opposed to the contact surface 106 of the partition wall 70. The seal portion 55 surrounds the second opening 102 of the second orifice 112. The seal portion 55 has its round tip. The seal portion 55 is slightly higher than the respective projections 54. The seal portion is higher than each projection 54 by about 0.3 to about 0.5 mm, for example.

Figure 5:
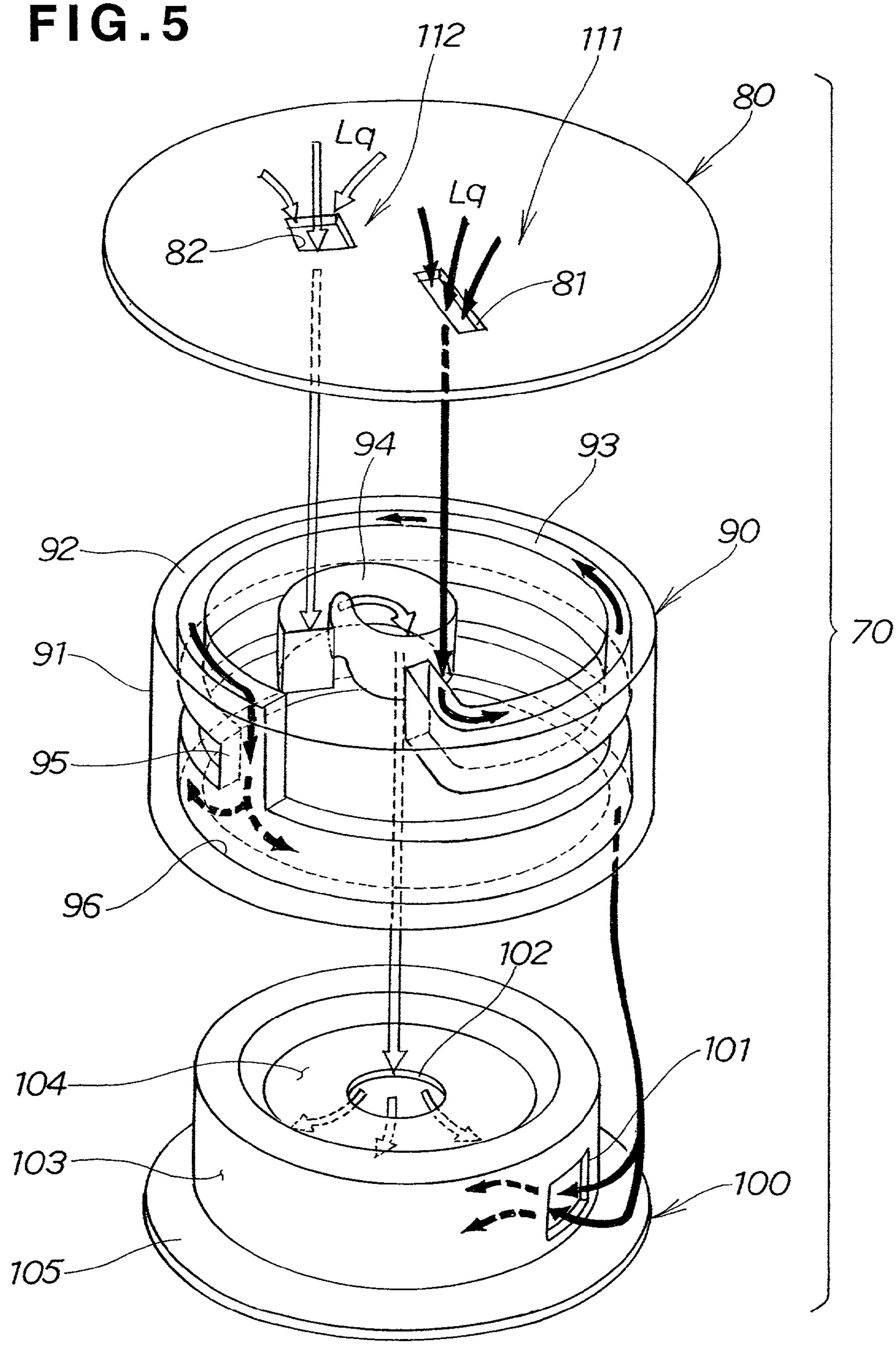
FIG. 5 is an exploded view of the partition wall with a middle partition thereof made transparent for the purpose of illustrating the flow of an actuating liquid through first and second orifices formed in the partition wall.

Referring to FIG. 5, the actuating liquid Lq flows through the first orifice 111, as shown by solid arrows. The actuating liquid Lq flows through the second orifice 112, as shown by open arrows. The first passageway 93 is a spiral groove formed in the proximity of an outer peripheral edge of the middle partition member 90. The second passageway 94 is a spiral groove formed centrally of the middle partition member 90.

The first orifice 111 and second orifice 112 provide different resistances to the liquid flowing therethrough. In other words, the resistance provided by the first orifice 111 is different from the resistance provided by the second orifice 112. For example, the first orifice 111 differs from the second orifice 112 in at least either the diameter of aperture or the length of passageway.

The first orifice 111 is designed allowing for reducing a vibration of the engine En running at an engine speed higher than the idling speed. Meanwhile, the second orifice 112 is designed allowing for reducing a vibration of the engine En running at the idling speed. The second orifice 112 is larger in diameter of the aperture, and is smaller in length of the passageway than the first orifice 111.

The liquid Lq flows into the first aperture 81 through the first passageway 93, the vertical aperture 95, and the inner peripheral groove 96 out of the first opening 101, as shown by the solid arrows, after which the liquid Lq flows into the lower partition member 100 in the opposite direction to the direction of the flow through the first passageway 93.

Meanwhile, the liquid Lq flows into the second aperture 82 through the second passageway 94 out of the second opening 102, as shown by the open arrows, after which the liquid Lq flows into the lower partition member 100.

Discussion will be made as how the engine mount is operated, in relation to FIG. 1 and FIG. 6 to FIG. 10.

The control unit 145 is supplied with signals output from a variety of sensors (not shown) to thereby determine whether the engine speed of the engine En is the idling speed.

When the engine En runs at the engine speed higher than the idling speed, the control unit 145 outputs no valve control signal. The switch valve 142 is in a state where the chambers 134, 134 both have the atmospheric pressure therein.

The resilient means 137 forces the valve 131 and the diaphragm 50 to thereby close the opening 102 of the second orifice 112, as shown in FIG. 1. With the second orifice 112 closed by the diaphragm 50, the liquid Lq within the primary and secondary chambers 61, 62 is not allowed to flow through the second orifice 112.

The rubbery elastic member 40 then elastically deforms and the liquid Lq flows between the primary chamber 61 and the secondary chamber 62 by passing through the first orifice 111, thereby reducing the vibration of the engine En running at the speed higher than the idling speed.

Figure 6:
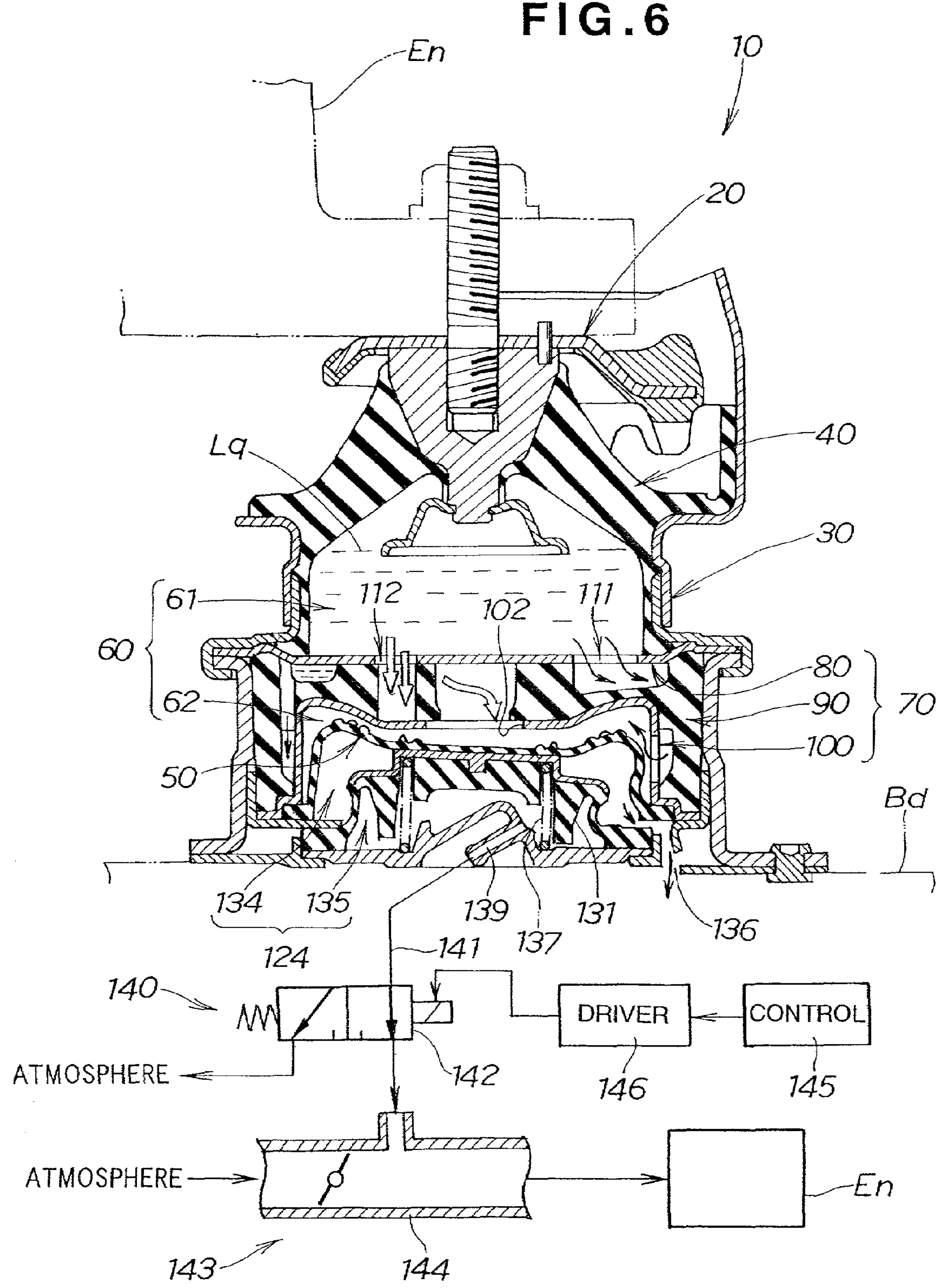
FIG. 6 is a vertical cross-sectional view of the engine mount analogous to FIG. 1, with the second orifice opened.

When the engine runs at the idling speed, the control unit 145 outputs the valve control signal to the valve driver 146. Upon receiving the valve control signal, the valve driver 146 outputs the valve switch signal, causing the switch valve 142 to bring the pipe 141 into communication with the intake manifold 144, as shown in FIG. 6. Because the intake manifold has a negative pressure therein, the chamber 135 produces the negative pressure therein. This causes the valve 131 to be lowered against a resilient force the resilient means 137 exerts thereon. The diaphragm 50 is also lowered along with the valve 131 to thereby open the opening 102 of the second orifice 112, such that the second orifice 112 communicates with the secondary chamber 62. Therefore, the liquid Lq within the primary and secondary chambers 61, 62 is allowed to flow through the second orifice 112.

The rubbery elastic member 40 elastically deforms and the liquid Lq flows between the primary chamber 61 and the secondary chamber 62 by passing through the first and second orifices 111, 112, thereby reducing the vibration of the engine En running at the idling speed.

Using the thus arranged engine mount 10, it becomes possible to reduce a wide variety of vibrations having different frequencies and amplitudes corresponding to the engine speed of the engine En.

Figure 7A:
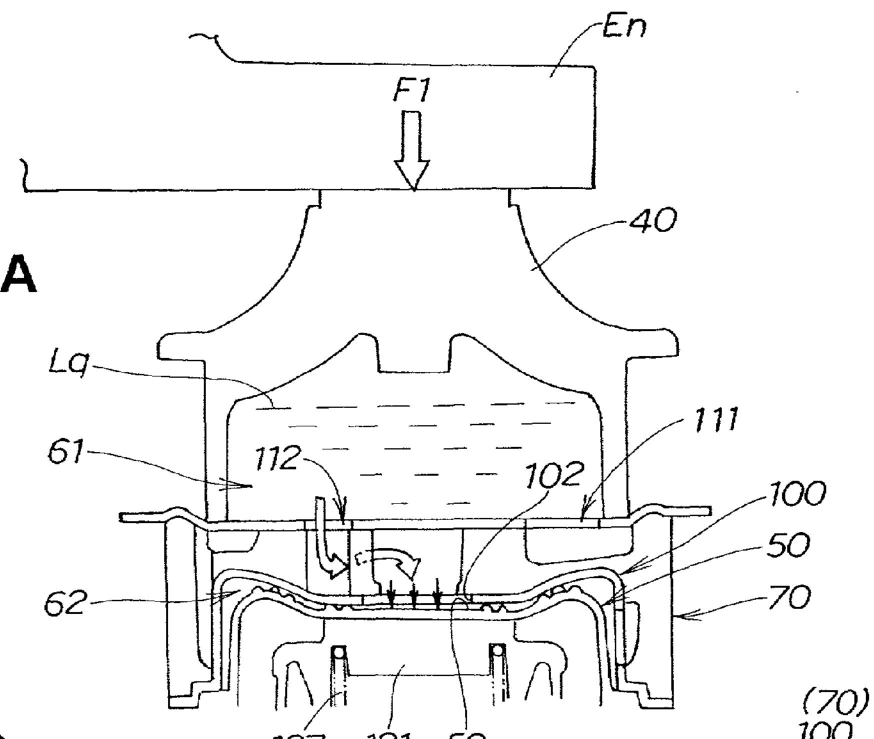
FIG. 7A and FIG. 7B illustrate how the diaphragm undergoes a pressure of the actuating liquid when an engine is started.
Figure 7B:
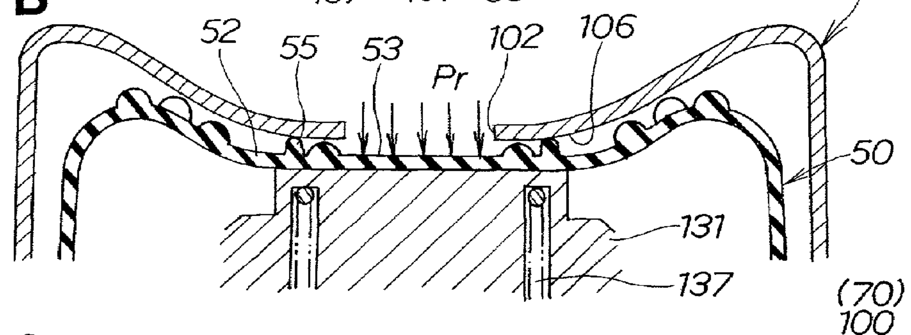
Figure 7C:
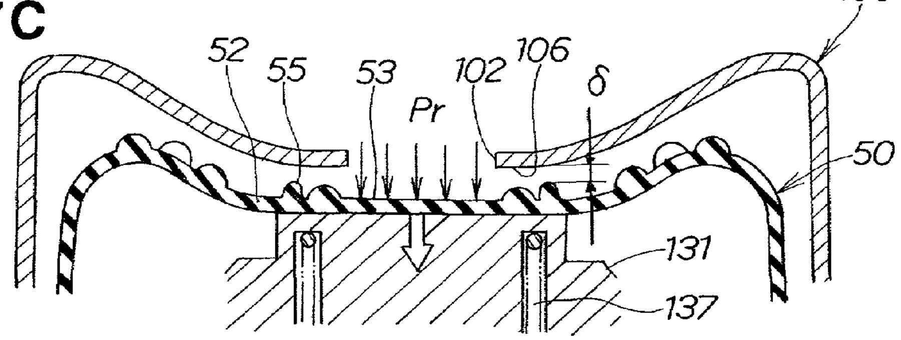
FIG. 7C illustrates the diaphragm forced down by the liquid pressure.

Shown in FIG. 7A is the engine En applying a compressing force F1 to the rubbery elastic member 40. FIG. 7B and FIG. 7C illustrate how the diaphragm 50 is operated when the force F1 is applied to the rubbery elastic member 40.

At a time when the engine En is started with the opening 102 of the second orifice 112 closed, little or no negative pressure is produced within the intake manifold 144. It is thus impossible to move the diaphragm 50 using the negative pressure.

Once the engine En is started, the relatively large compressing force F1 is intermittently exerted on the rubbery elastic member 40 under the influence of cranking and the like. It takes only a short period of time per exertion of the force F1 on the member 40. In response to the exertion of the force F1 on the rubbery elastic member 40, the liquid Lq within the primary chamber 61 is forced in such a manner as to flow out of the second orifice 112 as well as the first orifice 111. The force F1 is large and hence the liquid Lq exerts a large pressure Pr on the diaphragm 50.

When the pressure Pr is greater than the resilient force the resilient means 137 exerts on the diaphragm 50 in the opposite direction to the direction of the pressure Pr, the contact surface 53 of the diaphragm 50 moves away from the contact surface 106 of the partition wall 70 by a small distance δ. The movement of the diaphragm 50 away from the partition wall 70 opens the opening 102 of the second orifice 112, as shown in FIG. 7C.

Figure 8A:
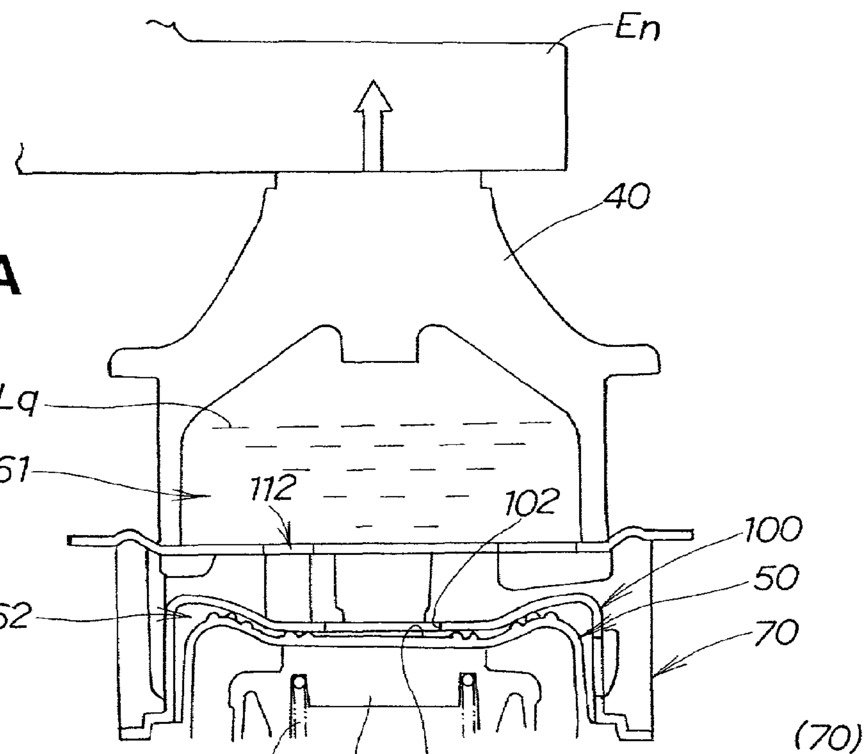
FIG. 8A and FIG. 8B illustrate how the diaphragm is forced up by a resilient force of a resilient means.
Figure 8B:
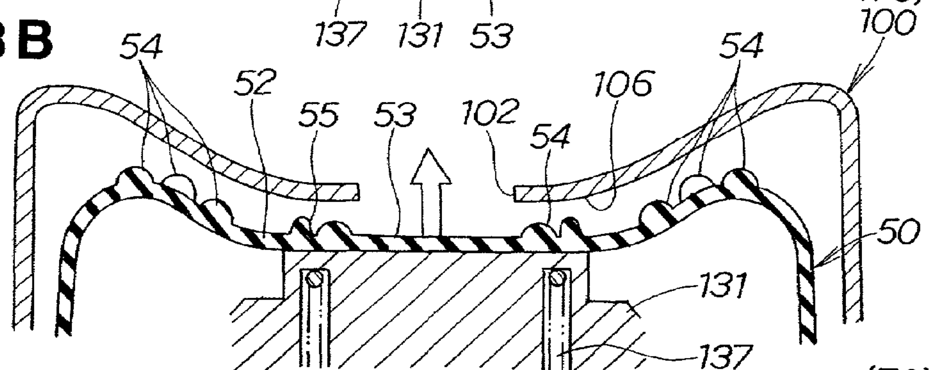
Figure 8C:
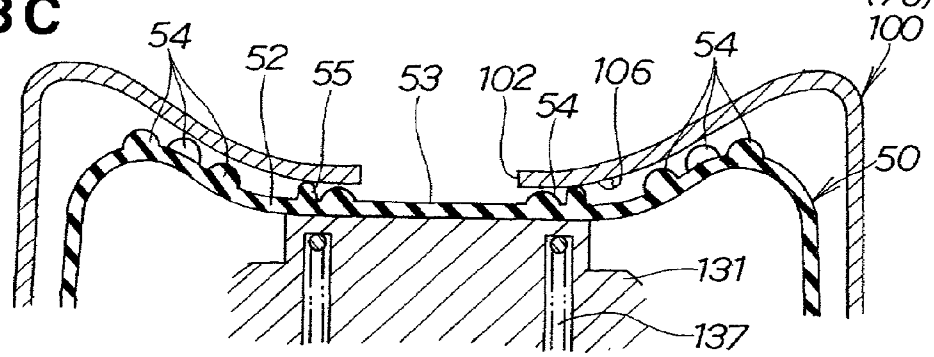
FIG. 8C illustrates impact of the diaphragm on the lower partition member.

Each time the diaphragm 50 moves away from the partition wall 70, the exertion of the force F1 on the diaphragm 50 is terminated. The diaphragm 50 is thus returned to its original position by the resilient force, as shown in FIG. 8A and FIG. 8B. At this time, the contact surface 53 of the diaphragm 50 comes into aggressive or violent impact on the contact surface 106 of the partition wall 70, as shown in FIG. 8C.

More specifically, the contact surface 53 strikes the contact surface 106 only at the plural hemispherical projections 54 of small size rather than at the entire area thereof. Consequently, the diaphragm 50 aggressively or violently contacts the partition wall 70 without producing any noise.

The projections 54 are of small size, and made of rubber. On hitting the partition wall 70, the projections 54 have only their round tips pressed against the contact surface 106 of the partition wall 70. The projections 54 are then easily deformed to thereby absorb the impact on the contact surface 106. As a result, it becomes possible to prevent noise from being produced upon the impact of the contact surface 53 against the contact surface 106.

With the opening 102 closed by the diaphragm 50, the seal portion 55 is in sealing engagement with the contact surface 106. This becomes possible to ensure that a seal is provided between the contact surfaces 53, 106. Therefore, the opening 102 of the diaphragm 50 is sufficiently sealed.

The seal portion 106 as well as the projections 54 are more easily provided to the contact surface 53 than to the contact surface 106.

The diaphragm 50 may be attached to either the engine mounting member 20 or the body mounting member 30 in opposed relation to the rubbery elastic member 40.

The projections 54 may be provided to either one or both of the contact surface 106 and the contact surface 53 to serve the above described function.

The seal portion 55 may be provided to either one or both of the contact surface 106 and the contact surface 53 to serve the above stated function.

The present disclosure relates to the subject matter of Japanese Patent Application No. 2001-234890, filed Aug. 2, 2001, the disclosure of which is expressly incorporated herein by reference in its entirety.

What is claimed is:

1. A liquid-filled engine mount comprising:

an engine mounting member to be mounted to an engine;

a body mounting member to be mounted to a vehicle body;

a rubbery elastic member interposed between said engine mounting member and said body mounting member;

a diaphragm mounted to at least one of said engine mounting member and said body mounting member in opposed relation to said rubbery elastic member, said diaphragm defining a liquid chamber in cooperation with said engine mounting member, said body mounting member, and said rubbery elastic member, said liquid chamber containing an actuating liquid therein;

a partition wall disposed within said liquid chamber to separate said liquid chamber into a primary chamber and a secondary chamber, said partition wall having first and second orifices formed to extend therethrough, said first orifice communicating with said primary chamber and said secondary chamber, said second orifice communicating with said primary chamber;

a resilient means for urging said diaphragm into contact with said partition wall such that said second orifice does not communicate with said secondary chamber;

said diaphragm, by moving against said resilient means, allowing said second orifice to come into communication with said secondary chamber;

said first orifice and said second orifice providing resistances to said actuating liquid flowing therethrough, the resistance provided by said first orifice being different from the resistance provided by said second orifice; and said diaphragm and said partition wall having surfaces contacting each other, said surface of said diaphragm having plural projections and a seal portion formed thereon, the plural projections and seal portion facing said surface of said partition wall, said seal portion configured to seal around an opening of said second orifice, said plural projections being formed on said diaphragm so that they are disposed within a perimeter defined by said seal portion and being disposed outside the perimeter of said seal portion, and said plural projections being configured to reduce generation of noise when the diaphragm is urged into contact with the partition wall.

2. A liquid-filled engine mount as claimed in claim 1, wherein both of said surfaces of said diaphragm and said partition wall have projected seal portions formed thereon, said projected seal portions surrounding an opening of said second orifice.

3. A liquid-filled engine mount as claimed in claim 1, wherein said plural projections each make a point contact with said surface of said partition.

4. A liquid-filled engine mount as claimed in claim 1, wherein said seal portion extends further from said surface of said diaphragm than said plural projections.

5. A liquid-filled engine mount as claimed in claim 1, wherein said seal portion comprises a cylindrical shaped rib and at least some of said plural projections are hemispherical shaped.

* * * * *